United States Patent
Huprikar et al.

(10) Patent No.: US 7,503,552 B2
(45) Date of Patent: Mar. 17, 2009

(54) MOUNT ASSEMBLY

(75) Inventors: Anand Huprikar, Novi, MI (US); William G. Dieter, Taylor, MI (US)

(73) Assignee: BASF Corporation, Florham Park, NJ (US)

( * ) Notice: Subject to any disclaimer, the term of this patent is extended or adjusted under 35 U.S.C. 154(b) by 301 days.

(21) Appl. No.: 11/153,668

(22) Filed: Jun. 15, 2005

(65) Prior Publication Data

US 2005/0280195 A1  Dec. 22, 2005

Related U.S. Application Data

(60) Provisional application No. 60/580,956, filed on Jun. 18, 2004.

(51) Int. Cl.
*F16F 7/00* (2006.01)
(52) U.S. Cl. ............... 267/141.1; 267/140.13; 267/293; 267/294
(58) Field of Classification Search ............ 267/140.11, 267/140.13, 141.1, 293, 294, 153, 141.2, 267/220; 296/190.07, 35.1, 35; 248/634, 248/635; 280/124.155, 124.147
See application file for complete search history.

(56) References Cited

U.S. PATENT DOCUMENTS

| | | | |
|---|---|---|---|
| 3,350,042 A | 10/1967 | Stewart et al. | |
| 3,622,194 A | 11/1971 | Bryk | |
| 4,286,777 A | 9/1981 | Brown | |
| 4,298,193 A | 11/1981 | Mourray | |
| 4,407,491 A * | 10/1983 | Kunihiro et al. | 267/140.13 |
| 4,434,977 A | 3/1984 | Chiba et al. | |
| 4,478,396 A | 10/1984 | Kawaura | |
| 4,530,491 A | 7/1985 | Bucksbee et al. | |
| 4,720,075 A * | 1/1988 | Peterson et al. | 248/635 |
| 4,783,039 A | 11/1988 | Peterson et al. | |
| 4,804,169 A | 2/1989 | Hassan | |
| 4,805,886 A | 2/1989 | Hassan | |
| 4,895,115 A | 1/1990 | Weber et al. | |
| 5,158,269 A | 10/1992 | Hein et al. | |
| 5,580,028 A * | 12/1996 | Tomczak et al. | 248/634 |
| 5,743,509 A * | 4/1998 | Kanda et al. | 248/635 |
| 5,799,930 A | 9/1998 | Willett | |
| 6,030,016 A | 2/2000 | Rice | |
| 6,182,953 B1 | 2/2001 | Smith et al. | |
| 6,296,237 B1 | 10/2001 | Nagai | |
| 6,361,096 B2 | 3/2002 | Kim | |
| 6,364,296 B1 | 4/2002 | Cummings et al. | |
| 6,412,798 B2 | 7/2002 | De Fontenay et al. | |
| 6,416,102 B1 | 7/2002 | Howard | |
| 6,435,489 B1 * | 8/2002 | Rice et al. | 267/140.5 |
| 6,502,883 B2 * | 1/2003 | Rice | 296/35.1 |

(Continued)

*Primary Examiner*—Robert A Siconolfi
*Assistant Examiner*—Mariano Sy

(57) ABSTRACT

A mount assembly having a support structure mounted to a frame of a vehicle and a carrier mounted to a vehicle body. The support structure is displaceable relative to the carrier along a central axis (L). The support structure defines an inverted cup having a bottom with an aperture and a cylindrical skirt on a central axis (L) extending below the frame. A lower insulator is disposed between the support structure and a plate allowing the lower insulator to interact with the bottom and cylindrical skirt of the support structure and the plate to isolate forces in a vertical and/or lateral direction. The interaction with the support structure and the plate improves handling of lateral forces seen in a vehicle during driving events such as braking or cornering.

20 Claims, 3 Drawing Sheets

U.S. PATENT DOCUMENTS

| | | |
|---|---|---|
| 6,523,817 B1 | 2/2003 | Landry, Jr. |
| 6,588,820 B2 * | 7/2003 | Rice .......................... 296/35.1 |
| 6,752,389 B2 * | 6/2004 | Halladay et al. ....... 267/140.12 |
| 7,048,265 B2 * | 5/2006 | Huprikar ................. 267/141.1 |
| 2001/0015537 A1 | 8/2001 | De Fontenay et al. |
| 2002/0121793 A1 | 9/2002 | Rice |
| 2003/0057723 A1 | 3/2003 | Rice |

* cited by examiner

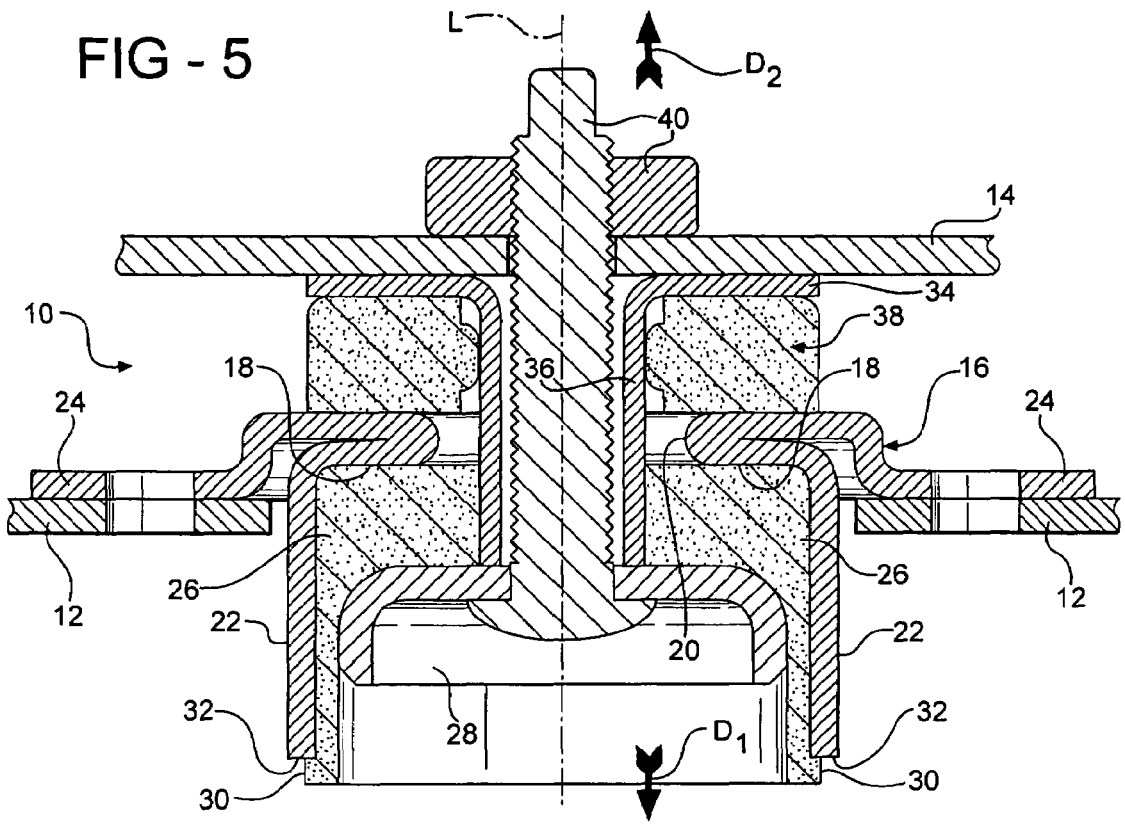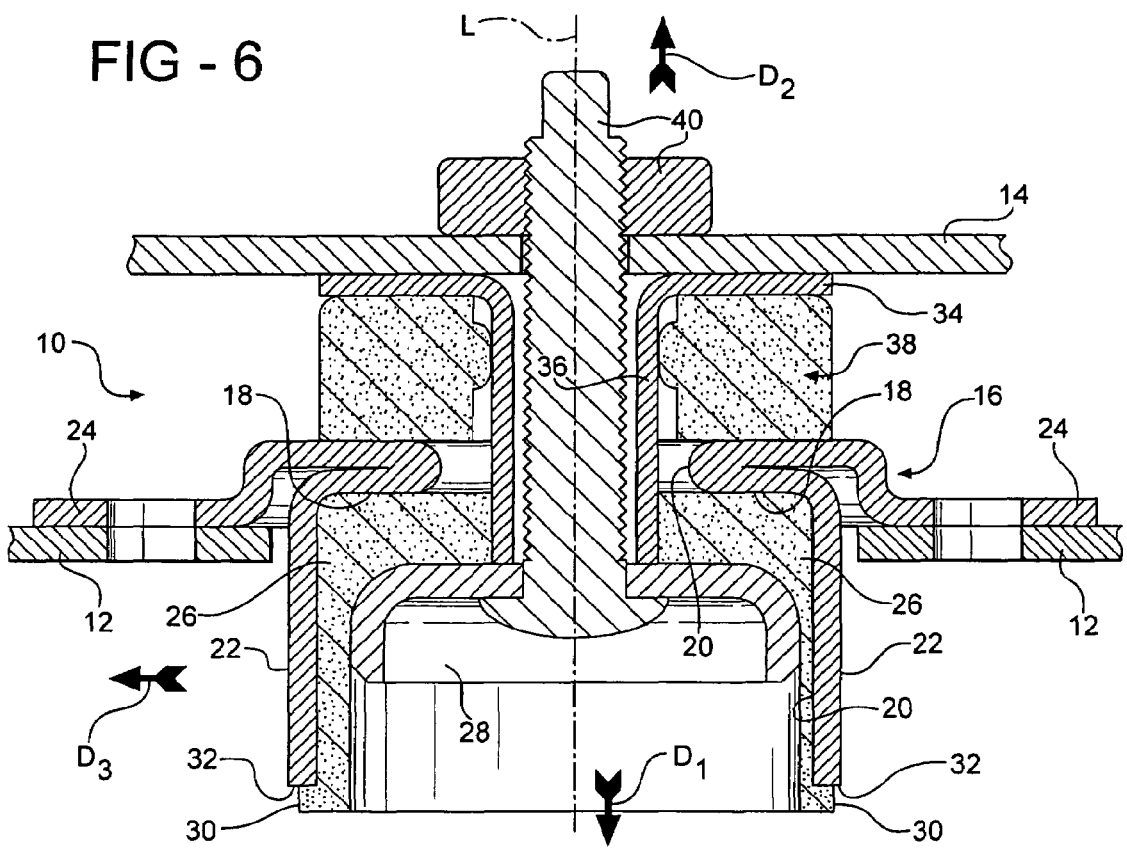

MOUNT ASSEMBLY

RELATED APPLICATION

This patent application claims priority to and all the benefits of U.S. Provisional Patent Application, Ser. No. 60/500,956, which was filed on Jun. 18, 2004.

BACKGROUND OF THE INVENTION

1. Field of the Invention

The subject invention relates to a mount assembly for a vehicle having a frame and a vehicle body wherein the mount assembly isolates various movements between the frame and vehicle body.

2. Description of the Related Art

Mount assemblies for vehicles are well known in the art. Examples of such assemblies are shown in U.S. Pat. Nos. 5,743,509 and 6,416,102. Each of these assemblies includes a support structure that engages with the frame and a carrier mounted to a vehicle body. The carrier is coupled to the support structure through one or more insulators. The insulators are typically formed of an elastomeric material such as rubber or polyurethane.

One important factor in the development of mount assemblies relates to the rate of elasticity, also known as a spring rate, of the insulators. The insulators can have a relatively soft spring rate, which is preferred for isolating vibrational motion. Vibrational motion is generally associated with lower amplitudes and higher frequencies, such as when a vehicle travels over typical undulations of a road surface. It is desirable to have the insulators operate at lower or softer spring rate to allow for improved isolation and cushioning of the vibrations of the frame relative to the vehicle body.

On the other hand, the insulators can have relatively stiff or hard spring rates, which is preferred for controlling translational motion. Translational motion is typically associated with high amplitude, lower frequency impacts such as the occasional large impact when a vehicle passes over a pothole. The impacts cause a maximum displacement of the frame relative to the vehicle body.

The prior art rubber materials are such that the effective spring rate is relatively linear with the load increasing relative to the displacement of the insulator. The above trade off and linear spring rate resulted in an insulator having a soft spring rate or a stiff spring rate, but not both. This resulted in a vehicle ride characteristic that was not ideal for isolating both vibrational and translational motion associated with the movements of the frame.

The trade off in material versus spring rate has resulted in many mount assemblies utilizing materials with non-linear spring rates, such as polyurethane elastomers, which include microcellular polyurethane (MPU). Polyurethane elastomers are such that they do not have a linear spring rate and therefore can offer an insulator material capable of isolating a variety of movements of the frame to provide improved ride characteristics of the vehicle. In particular, the MPU material offers an initial low spring rate to isolate the vibrational force and additionally, as the MPU material compresses, the spring rate stiffens. This characteristic of MPU is an improvement over rubber materials. However, the prior art uses of polyurethane elastomers have additional concerns such as forming the insulator into multidimensional shapes and positioning the insulator in the mount assembly. The prior art mounts utilizing MPU are typically a simple cylindrical designs. This cylindrical shape provides limited capability of the mount to isolate lateral forces associated with frame movement.

Accordingly, it would be desirable to develop an insulator utilizing a polyurethane elastomer, such as microcellular polyurethane, formed in a shape and positioned within a mount assembly to interact with both horizontal and vertical surfaces to isolate both lateral and vertical forces associated with movements of a frame relative to a vehicle body.

BRIEF SUMMARY OF THE INVENTION AND ADVANTAGES

The subject invention relates to a mount assembly for a vehicle having a frame and a vehicle body wherein movements of the frame relative to the vehicle body are isolated by an insulator. In particular, the mount assembly comprises of a support structure defining an inverted cup having a bottom with an aperture and a cylindrical skirt extending on a central axis below the frame. A lower insulator made of urethane elastomer is formed into an inverted cup and positioned within the cylindrical skirt and bottom of the support structure. A plate, having an aperture is formed in a cup-shape about the axis to nestle the lower insulator within the inverted cup of the support structure. The lower insulator thereby interacts with the bottom and cylindrical skirt of the support structure and plate to isolate both vertical and lateral forces associated with the movements of the frame relative to the vehicle body.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a cross-sectional view of the mount assembly responding to a vertical force along a central axis.

FIG. 6 is a cross-sectional view of the mount assembly responding to both the vertical force and a lateral force perpendicular to the central axis.

DETAILED DESCRIPTION OF THE INVENTION

Figure 1:
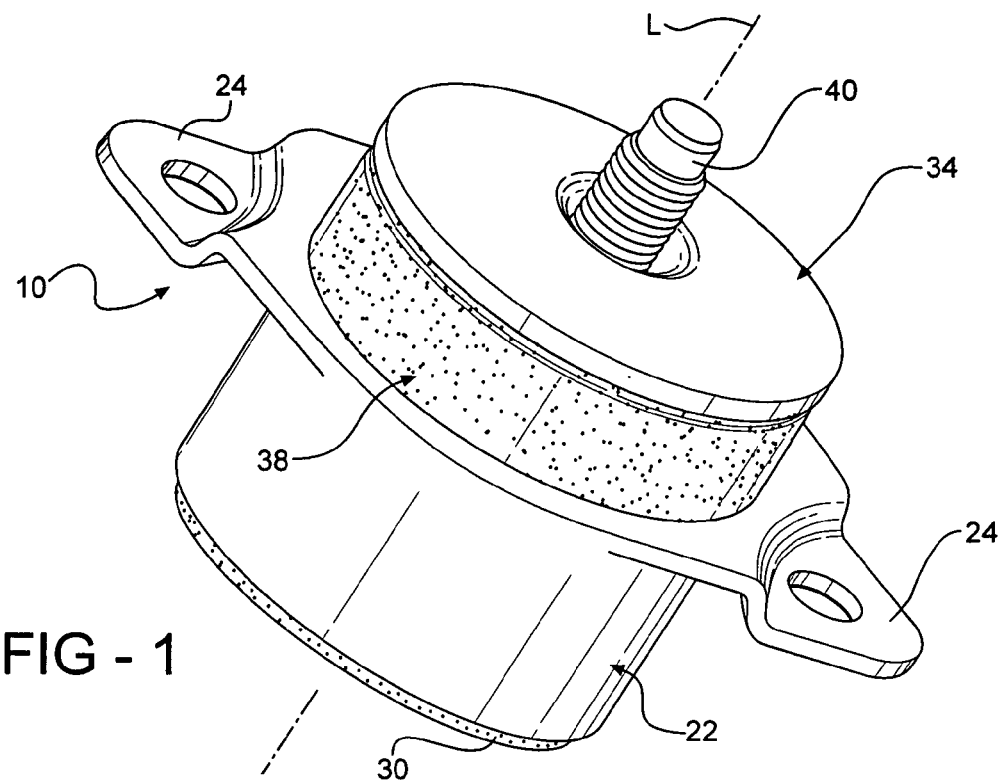
FIG. 1 is a perspective view of a mount assembly.
Figure 2:
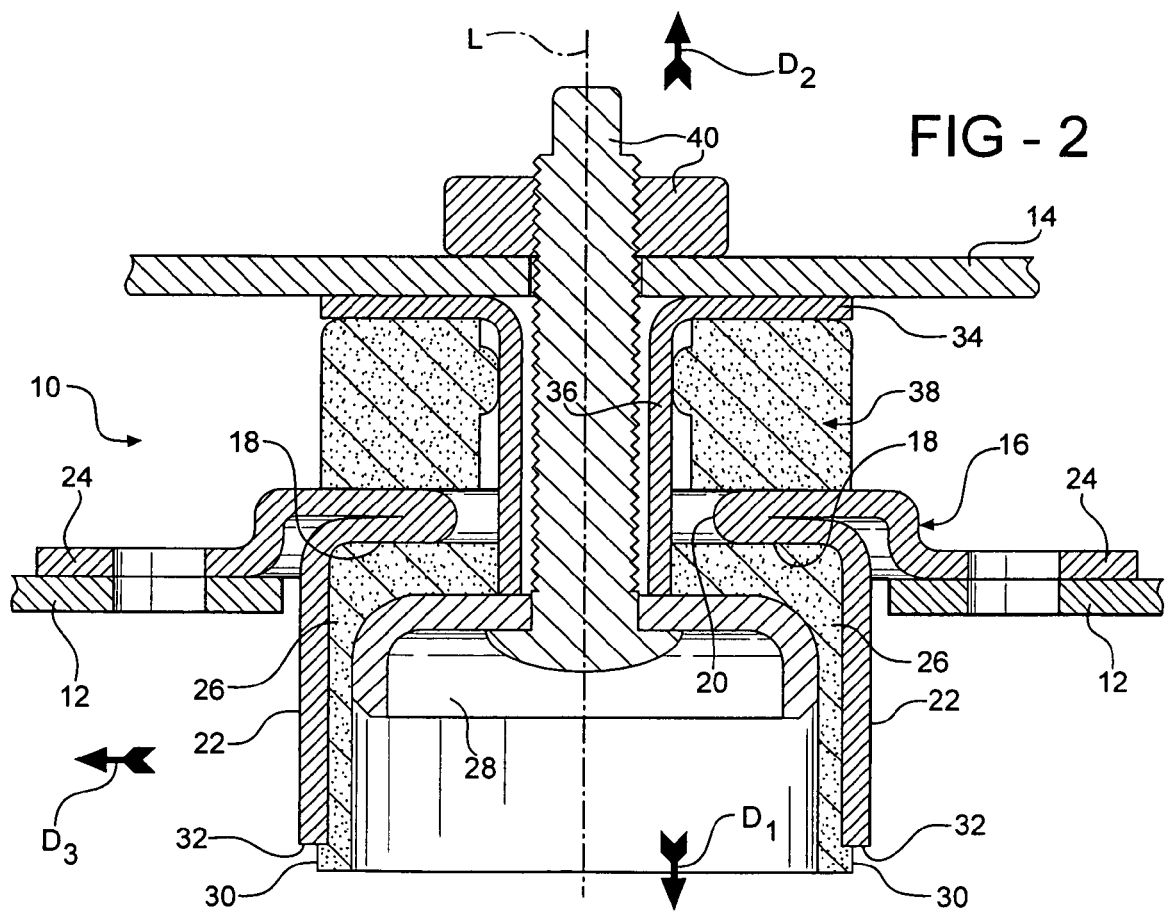
FIG. 2 is a cross-sectional view of the mount assembly installed in a vehicle in a rest state.

Referring to the Figures, wherein like numerals indicate like parts throughout the several views, a mount assembly in accordance with the subject invention is generally shown at 10 in FIGS. 1 and 2. The mount assembly 10 shown in FIG. 2 is installed within a vehicle at a rest state. The mount assembly 10 isolates forces by either expansion and/or compression of an insulator, as will be discussed below. In the preferred embodiment, the mount assembly 10 is used with a vehicle having a frame 12 and a vehicle body 14. The frame 12 and vehicle body 14 can be of any suitable design or configuration without deviating from the scope of the subject invention. In addition, it should be appreciated by those skilled in the art that the subject invention may be incorporated into different apparatuses and the subsequent discussion relating to the vehicle is but one contemplated environment in which the invention could be used.

The mount assembly 10 comprises of a support structure 16 defining an inverted cup having a bottom 18 with an aperture 20 and a cylindrical skirt 22 on a central axis (L). The cylindrical skirt 22 is configured to extend below the frame 12. Preferably, the cylindrical skirt 22 extends a greater distance along the axis (L) than a plate 28. Hence, the cylindrical skirt 22 extends a length along the axis (L) such that the maximum force in a direction $D_2$ does not allow the plate 28 to transition past the cylindrical skirt 22. The support structure 16 is preferably made of a single piece of metal, which forms the cylindrical skirt 22 and support flanges 24. The support flanges 24 extend radially from the support structure 16. In the preferred embodiment the support flanges 24 are extensions created by the support structure 16 overlapping the bottom 18 of the cylindrical skirt 22 as a single unit. However, it is appreciated that there are many alternatives, such as the support flanges 24 being separate parts and connected to the support structure 16, by welding, binding or the like. The support flanges 24 support the mount assembly 10 and are adapted to connect with and secure to the frame 12 utilizing any suitable attachment device. The support structure 16 and frame 12 therefore move as a single unit.

Figure 3:
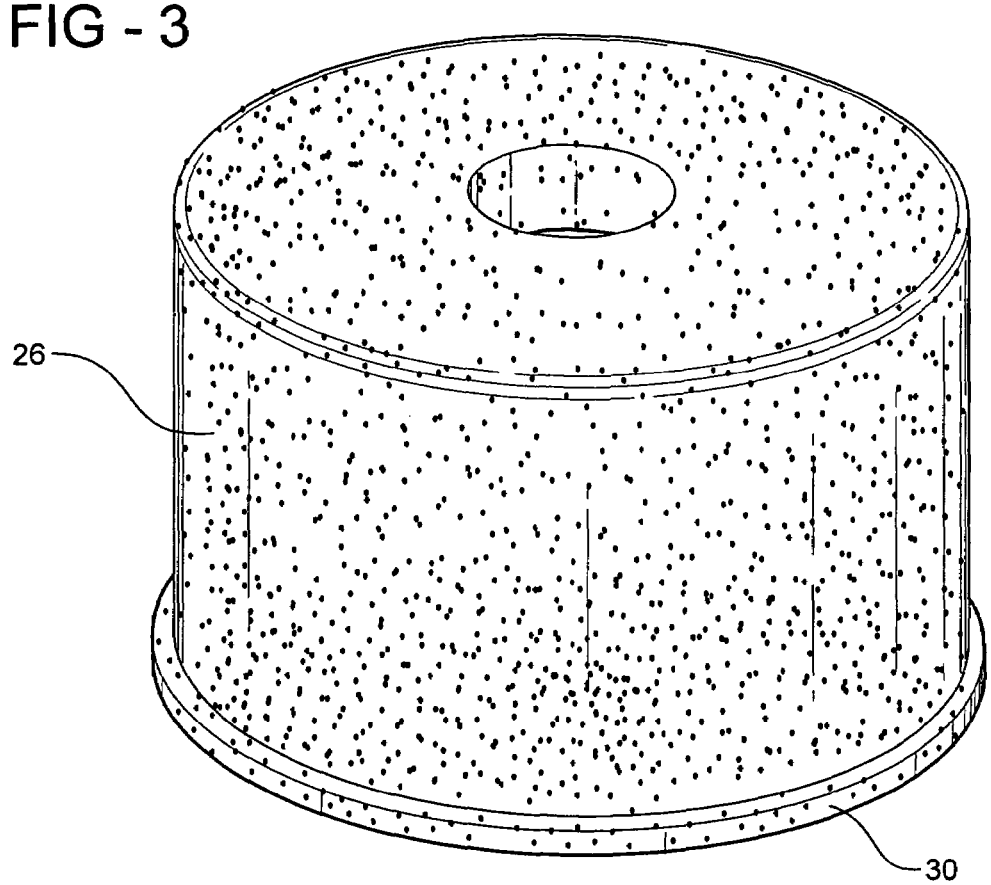
FIG. 3 is a perspective view of a lower insulator.
Figure 4:
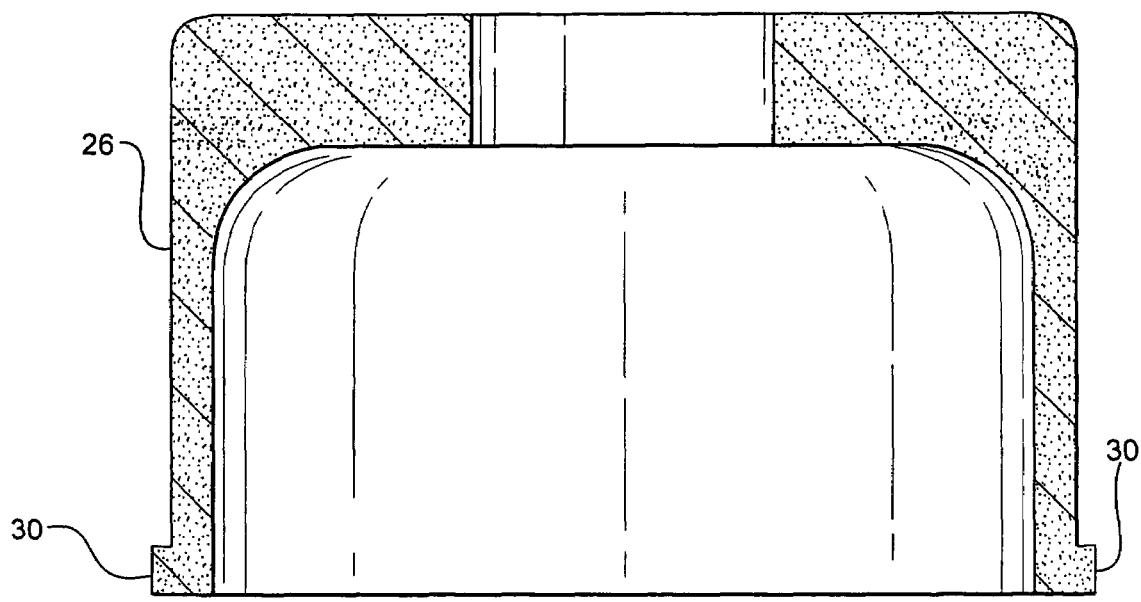
FIG. 4 is a cross-sectional view of the lower insulator.

A lower insulator 26 is supported within the cylindrical skirt 22 of the support structure 16. A bottom edge 32 on the cylindrical skirt 22 provides additional engagement with the lower insulator 26 to further support, as discussed below. Referring to FIGS. 3 and 4, the lower insulator 26 is shown in greater detail. The lower insulator 26 is a urethane elastomer preferably made of a microcellular polyurethane. Alternatively, the lower insulator 26 could be made of a thermoplastic polyurethane. The lower insulator 26 is configured to be positioned into the cylindrical skirt 22 of the support structure 16. Preferably the lower insulator 26 extends along the central axis (L) to a length greater than that of the cylindrical skirt 22. The lower insulator 26 isolates the plate 28 from the cylindrical skirt 22. The lower insulator 26 has a radial projection 30 that interacts with the bottom edge 32 of the cylindrical skirt 22. The radial projection 30 provides a stiffening effect to the lower insulator 26. The stiffening of the lower insulator 26 and the interaction with the bottom edge 32 provides stability to the lower insulator 26 to aid in retention of the lower insulator 26 within the cylindrical skirt 22 during assembly of the mount assembly 10 to the frame 12 and vehicle body 14.

The lower insulator 26 is formed into a cup shape as shown best in the cross-sectional view in FIG. 4. FIG. 4 illustrates the free state of the lower insulator 26 before installation into the mount assembly 10. As known to those skilled in the art, the lower insulator 26 is compressed when installed into the support structure 16, such as shown in FIG. 2. Hence, the lower insulator 26 is under a compression force when the mount assembly 10 is secured to the vehicle, even when the vehicle is at a rest state. The solid cup shaped lower insulator 26 is advantageous to allow the insulator 26 to interact with the bottom 18 and the cylindrical skirt 22 of the support structure 16 and the plate 28 to isolate forces in all directions (vertical and lateral) as experienced by a moving vehicle.

The plate 28 has an aperture and is formed in a cup-shape to produce a first surface and a second surface surrounding the axis (L) to secure and interact with the lower insulator 26. In particular, the plate 28 nestles the lower insulator 26 within the inverted cup of the support structure 16. Preferably, the first surface extends substantially transverse to the central axis (L) and abuts the lower insulator 26. Further, the aperture is preferably disposed through the first surface of the plate 28. The second surface of the plate 28 extends from the first surface and extends substantially parallel to the central axis (L). The second surface also abuts the lower insulator 26. In order to adequately nestle the lower insulator 26, the second surface is substantially parallel to the cylindrical skirt 22. In fact, the plate 28 is preferably substantially cylindrical to complement the configuration of the support structure 16. The plate 28 is illustrated as being formed of metal, such as steel.

The positioning of the lower insulator 26 between the support structure 16 and the plate 28 allows the lower insulator 26 to interact with the bottom 18 and cylindrical skirt 22 of the support structure 16 and the plate 28 to isolate forces in both the vertical and/or lateral direction. Forces in the vertical direction $D_1$ or $D_2$ are forces caused by the up/down movement of the frame 12 relative to the vehicle body 14. These up/down movements of the frame 12 result in a force that is parallel to the central axis (L). Forces in the lateral direction $D_3$ refers to any movement of the frame 12 relative to the vehicle body 14 that is at an angle to the central axis (L). As illustrated in FIGS. 2, 5, and 6 these forces can be sideways or into and out of the page. The interaction between the cylindrical skirt 22 and the plate 28 separated by the lower insulator 26 improves the mount assembly 10 by better isolating the combination of forces in both vertical $D_1$ and $D_2$ and lateral $D_3$ directions during common driving events of the vehicle.

The mount assembly 10 further includes a carrier 34 that has an inner tubular member 36 extending through the aperture 20 of the support structure 16. The support structure 16 and carrier 34 are displaceable relative to each other along the axis (L) when the frame 12 moves relative to the vehicle body 14. An upper insulator 38 is disposed between the carrier 34 and the support structure 16 for coupling the carrier 34 to the support structure 16. Preferably, the upper insulator 38 is made of a urethane elastomer, such as a microcellular polyurethane. Alternatively, the upper isolator 38 could be made of a thermoplastic polyurethane. The tubular member 36 of the carrier 34 preferably extends through the upper insulator 38, lower insulator 26, and the aperture 20 of the support structure 16 to a distal end that engages with the plate 28. A fastener 40 abuts the plate 28, passes through the aperture of the plate 28, and passes through the tubular member 36 to connect the plate 28 and the tubular member 36 to the vehicle body 14. The tubular member 36 is therefore clamped between the carrier 34, vehicle body 14 and plate 28 such that these components move as one unit. The fastener 40 further attaches to the vehicle body 14 placing the entire mount assembly 10 under a compressive load. The compressive load of the fastener 40 compresses the insulators 26, 38 as seen in FIG. 2 shown assembled and attached to the vehicle at a rest state. The carrier 34 also includes a flange extending from the tubular member 36 around at least a portion of the upper insulator 38.

Referring to FIGS. 5 and 6 the mount assembly 10 is shown in different operational positions. In particular, FIG. 5 illustrates the mount assembly 10 when a vertical force $D_2$ is applied along the central axis (L). FIG. 6 illustrates the mount assembly 10 when a lateral force $D_3$ is applied perpendicular to the central axis (L) in addition to the vertical force $D_2$. The details of the isolation of the forces are discussed in greater detail below.

As shown in FIG. 5, a force $D_2$ applied along the central axis (L) causes an upward movement of the frame 12. The frame 12 in turn causes upward movement of the support structure 16. The upper insulator 38 defines a resistance for isolating the upward movement of the support structure 16 relative to the carrier 34. The force $D_2$ applied to the mount assembly 10 compresses the upper insulator 38 and decompresses the lower insulator 26, which appears to expand. Although not illustrated, it is appreciated that when a force $D_1$ is applied to the mount assembly 10, the upper insulator 38 will decompress and the lower insulator 26 will compress in response to the downward movement of the frame 12 and support structure 16. Further, the upper insulator 38 and the lower insulator 26 may both partially decompress and/or compress during the application of a force that is angularly applied to the central axis (L).

FIG. 6 shows the mount assembly 10 reacting to both a force in direction $D_2$ and an additional lateral force in direction $D_3$ that is applied perpendicular to the central axis (L). The lateral force is caused by the shifting movement of the frame 12 and support structure 16 in the direction of $D_3$. The lower insulator 26 both compresses and decompresses between the plate 28 (vehicle body 14) and the cylindrical skirt 22 of the support structure 16 (frame 12) to isolate lateral forces in the direction $D_3$. As orientated in FIG. 6, the right side of the lower insulator 26 is being compressed and the left side of the lower insulator 26 is being decompressed. The configuration and operation of the lower insulator 26 is advantageous to improve the handling and drive characteristics of the vehicle by isolating forces in all directions.

The invention has been described in an illustrative manner, and it is to be understood that the terminology that has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A mount assembly for use with a vehicle having a frame and a vehicle body, said mount assembly comprising:
   a support structure defining an inverted cup having a bottom with an aperture and a cylindrical skirt on a central axis (L) for extending below the frame,
   a lower insulator made of a urethane elastomer formed into an inverted cup and positioned within said cylindrical skirt and said bottom of said support structure about said axis with said lower insulator defining an exterior surface and an interior surface and said exterior surface of said lower insulator in continuous abutting engagement with said bottom and at least a portion of said skirt,
   a plate having an aperture and formed in a cup-shape on said axis (L) to nestle said lower insulator within said inverted cup of said support structure with said plate having a first surface extending substantially transverse to said axis (L) below said bottom with said first surface in continuous abutting engagement with said interior surface of said lower insulator to sandwich a first portion of said lower insulator between said first surface and said bottom and said plate having a second surface extending from said first surface substantially parallel to said axis (L) with said second surface in continuous abutting engagement with said interior surface of said lower insulator to sandwich a second portion of said lower insulator between said second surface and said cylindrical skirt whereby said lower insulator continuously interacts with said bottom and said cylindrical skirt of said support structure and said plate to isolate both vertical and lateral forces about said axis (L), and
   a fastener abutting said plate and extending through said aperture for connecting said plate to the vehicle body.

2. An assembly as set forth in claim 1 wherein said lower insulator is formed of microcellular polyurethane.

3. An assembly as set forth in claim 1 wherein said cylindrical skirt of said support structure extends a greater distance axially along said axis than said plate.

4. An assembly as set forth in claim 3 wherein said lower insulator extends axially beyond said cylindrical skirt of said support structure.

5. An assembly as set forth in claim 4 wherein said cylindrical skirt has a bottom edge.

6. An assembly as set forth in claim 5 wherein said lower insulator has a radial projection for interacting with said bottom edge of said cylindrical skirt to retain said lower insulator in position within said cylindrical skirt of said support structure.

7. An assembly as set forth in claim 3 wherein said support structure includes support flanges extending radially for supporting the assembly.

8. An assembly as set forth in claim 1 wherein said aperture is disposed through said first surface of said plate.

9. An assembly as set forth in claim 1 wherein said second surface is substantially parallel to said cylindrical skirt.

10. An assembly as set forth in claim 9 wherein said plate is substantially cylindrical.

11. An assembly as set forth in claim 10 wherein said plate is formed of metal.

12. A mount assembly for use with a vehicle having a frame and a vehicle body, said mount assembly comprising:
    a support structure defining an inverted cup having a bottom with an aperture and a cylindrical skirt on a central axis (L) for extending below the frame,
    a lower insulator made of a urethane elastomer formed into an inverted cup and positioned within said cylindrical skirt and said bottom of said support structure about said axis,
    a plate having an aperture and formed in a cup-shape on said axis (L) to nestle said lower insulator within said inverted cup of said support structure whereby said lower insulator interacts with said bottom and said cylindrical skirt of said support structure and said plate to isolate both vertical and lateral forces about said axis,
    a carrier extending through said aperture of said support structure wherein said support structure is displaceable relative to said carrier along said axis (L) when the frame moves relative to the vehicle body,
    an upper insulator disposed between said carrier and said support structure for coupling said carrier to said support structure to isolate vertical forces about said axis with said upper insulator being discontinuous with said lower insulator and isolating forces independently from said lower insulator, and
    a fastener abutting said plate and extending through said carrier for connecting said plate and said carrier to the vehicle body.

13. An assembly as set forth in claim 12 wherein said upper insulator is formed of a urethane elastomer.

14. An assembly as set forth in claim 13 wherein said upper insulator is formed of microcellular polyurethane.

15. An assembly as set forth in claim 12 wherein said carrier includes a tubular member extending through said upper insulator, said lower insulator, and said aperture of said support structure to a distal end engaging said plate.

16. An assembly as set forth in claim 15 wherein said fastener extends through said tubular member for connecting said plate and said tubular member to the vehicle body.

17. An assembly as set forth in claim 15 wherein said carrier includes a flange extending from said tubular member around at least a portion of said upper insulator.

18. An assembly as set forth in claim 12 wherein said lower insulator defines an exterior surface and an interior surface with said exterior surface of said lower insulator in continuous abutting engagement with said bottom and at least a portion of said skirt.

19. An assembly as set forth in claim 18 wherein said plate includes a first surface extending substantially transverse to said axis (L) below said bottom with said first surface in continuous abutting engagement with said interior surface of said lower insulator to sandwich a first portion of said lower insulator between said first surface and said bottom.

20. An assembly as set forth in claim 19 wherein said plate includes a second surface extending from said first surface substantially parallel to said axis (L) with said second surface in continuous abutting engagement with said interior surface of said lower insulator to sandwich a second portion of said lower insulator between said second surface and said cylindrical skirt.

\* \* \* \* \*